United States Patent
Hwang et al.

(10) Patent No.: US 9,134,199 B2
(45) Date of Patent: Sep. 15, 2015

(54) OPTICAL MONITORING SYSTEM FOR A GAS TURBINE ENGINE

(71) Applicant: General Electric Company, Schenectady, NY (US)

(72) Inventors: Wontae Hwang, Clifton Park, NY (US); Vinay Bhaskar Jammu, Bangalore (IN); Jason Harris Karp, Niskayuna, NY (US); Mohamed Sakami, West Chester, OH (US); William Albert Challener, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 158 days.

(21) Appl. No.: 13/925,485

(22) Filed: Jun. 24, 2013

(65) Prior Publication Data

US 2014/0373609 A1    Dec. 25, 2014

(51) Int. Cl.
*G01M 15/14*    (2006.01)

(52) U.S. Cl.
CPC ..................................... *G01M 15/14* (2013.01)

(58) Field of Classification Search
CPC ....................................................... G01M 15/14
USPC .............................. 73/112.01, 112.05, 118.03
See application file for complete search history.

(56) References Cited

U.S. PATENT DOCUMENTS

| | | | |
|---|---|---|---|
| 3,909,811 A * | 9/1975 | Adler | 340/870.13 |
| 4,316,670 A * | 2/1982 | Corwin et al. | 356/489 |
| 7,502,538 B2 | 3/2009 | Brummel et al. | |
| 7,623,226 B2 | 11/2009 | Legoupil | |
| 7,907,272 B2 | 3/2011 | Zelepouga et al. | |
| 8,063,372 B2 | 11/2011 | Lemieux et al. | |
| 8,151,647 B2 | 4/2012 | Twerdochlib | |
| 8,416,415 B2 | 4/2013 | Woodmansee et al. | |
| 8,422,030 B2 | 4/2013 | Bendall et al. | |
| 8,432,440 B2 | 4/2013 | Krull et al. | |
| 2003/0210406 A1 * | 11/2003 | Hardy | 356/603 |
| 2006/0038988 A1 | 2/2006 | Thermos | |
| 2008/0289342 A1 * | 11/2008 | Sappey et al. | 60/793 |
| 2010/0220182 A1 * | 9/2010 | Krull et al. | 348/83 |
| 2010/0272557 A1 * | 10/2010 | Woodmansee et al. | 415/118 |
| 2011/0240858 A1 * | 10/2011 | Estevadeordal et al. | 250/338.3 |
| 2011/0267428 A1 * | 11/2011 | George et al. | 348/46 |
| 2012/0002035 A1 * | 1/2012 | Li et al. | 348/82 |
| 2012/0101769 A1 | 4/2012 | Zombo et al. | |
| 2012/0140234 A1 * | 6/2012 | Masterson et al. | 356/445 |
| 2012/0153157 A1 * | 6/2012 | Estevadeordal et al. | 250/339.04 |
| 2012/0162192 A1 * | 6/2012 | Wang et al. | 345/419 |
| 2012/0194667 A1 * | 8/2012 | Banerjee et al. | 348/135 |

* cited by examiner

Primary Examiner — Eric S McCall
(74) Attorney, Agent, or Firm — Ann M. Agosti (57) ABSTRACT

A system for optically monitoring a gas turbine engine includes an optical multiplexer configured to receive multiple images from respective viewports into the gas turbine engine. The optical multiplexer includes a movable reflective device configured to selectively direct at least a portion of each image toward a detector array, and the detector array is directed toward a fixed location on the optical multiplexer.

16 Claims, 6 Drawing Sheets

OPTICAL MONITORING SYSTEM FOR A GAS TURBINE ENGINE

BACKGROUND

The subject matter disclosed herein relates to an optical monitoring system for a gas turbine engine.

Certain gas turbine engines include a turbine and/or a combustor having viewports configured to facilitate monitoring of various components within the turbine and/or the combustor. For example, a pyrometry system may receive radiation signals through the viewports to measure a temperature of certain components within a hot gas path of the gas turbine engine. The pyrometry system may include multiple sensors, each optically coupled to a corresponding viewport and configured to measure the intensity of radiation emitted by the turbine components and/or the combustor components. For example, certain sensors (e.g., optical sensors) are configured to provide a line-of-sight point temperature measurement or an average temperature measurement of each monitored component. Utilizing an infrared camera having a two-dimensional detector array may provide additional information regarding the performance of each monitored component, such as thermal stress within the component. However, due to the acquisition cost associated with infrared cameras, monitoring multiple viewports within the gas turbine engine using respective infrared cameras may be economically unfeasible.

BRIEF DESCRIPTION

In one embodiment, a system for optically monitoring a gas turbine engine includes an optical multiplexer configured to receive multiple images from respective viewports into the gas turbine engine. The optical multiplexer includes a movable reflective device configured to selectively direct at least a portion of each image toward a detector array, and the detector array is directed toward a fixed location on the optical multiplexer.

In another embodiment, a system for optically monitoring a gas turbine engine includes a detector array. The system also includes an optical multiplexer configured to receive a first image from a first viewport into the gas turbine engine and to receive a second image from a second viewport into the gas turbine engine. The optical multiplexer includes a movable reflective device configured to selectively move between a first position that directs at least a portion of the first image toward the detector array and a second position that directs at least a portion of the second image toward the detector array. In addition, the detector array is directed toward a fixed location on the optical multiplexer.

In a further embodiment, a system for optically monitoring a gas turbine engine includes a detector array. The system also includes an optical multiplexer configured to receive a first image from a first viewport into the gas turbine engine and to receive a second image from a second viewport into the gas turbine engine. The optical multiplexer includes a movable reflective device configured to selectively direct at least a portion of each image toward the detector array. In addition, the system includes a controller configured to instruct the reflective device to move between a first position that directs at least a portion of the first image toward the detector array and a second position that directs at least a portion of the second image toward the detector array. The detector array is directed toward a fixed location on the optical multiplexer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may facilitate determination of a two-dimensional temperature profile of multiple components within a gas turbine engine using a single detector array. In certain embodiments, an optical monitoring system includes an optical multiplexer configured to receive multiple images from respective viewports into a gas turbine engine. The optical multiplexer includes a movable reflective device configured to selectively direct at least a portion of each image toward a detector array, which is directed toward a fixed location on the optical multiplexer. For example, in certain embodiments, the optical monitoring system may include a mirror or a prism configured to rotate between a first position that directs at least a portion of a first image toward the detector array and a second position that directs at least a portion of a second image toward the detector array. In further embodiments, the optical multiplexer may include a mirror or a prism configured to translate between a first position that directs at least a portion of a first image toward the detector array and a second position that directs at least a portion of a second image toward the detector array. Because the optical multiplexer is configured to selectively direct multiple images from multiple viewports (e.g., into a turbine and/or into a combustor) toward a single detector array, the cost of the optical monitoring system may be substantially reduced, as compared to optical monitoring systems having multiple detector arrays (e.g., one detector array for each respective viewport). In addition, because the detector array may facilitate determination of a two-dimensional temperature profile of each monitored component, additional information (e.g., thermal stress within the component) may be determined.

Figure 1:
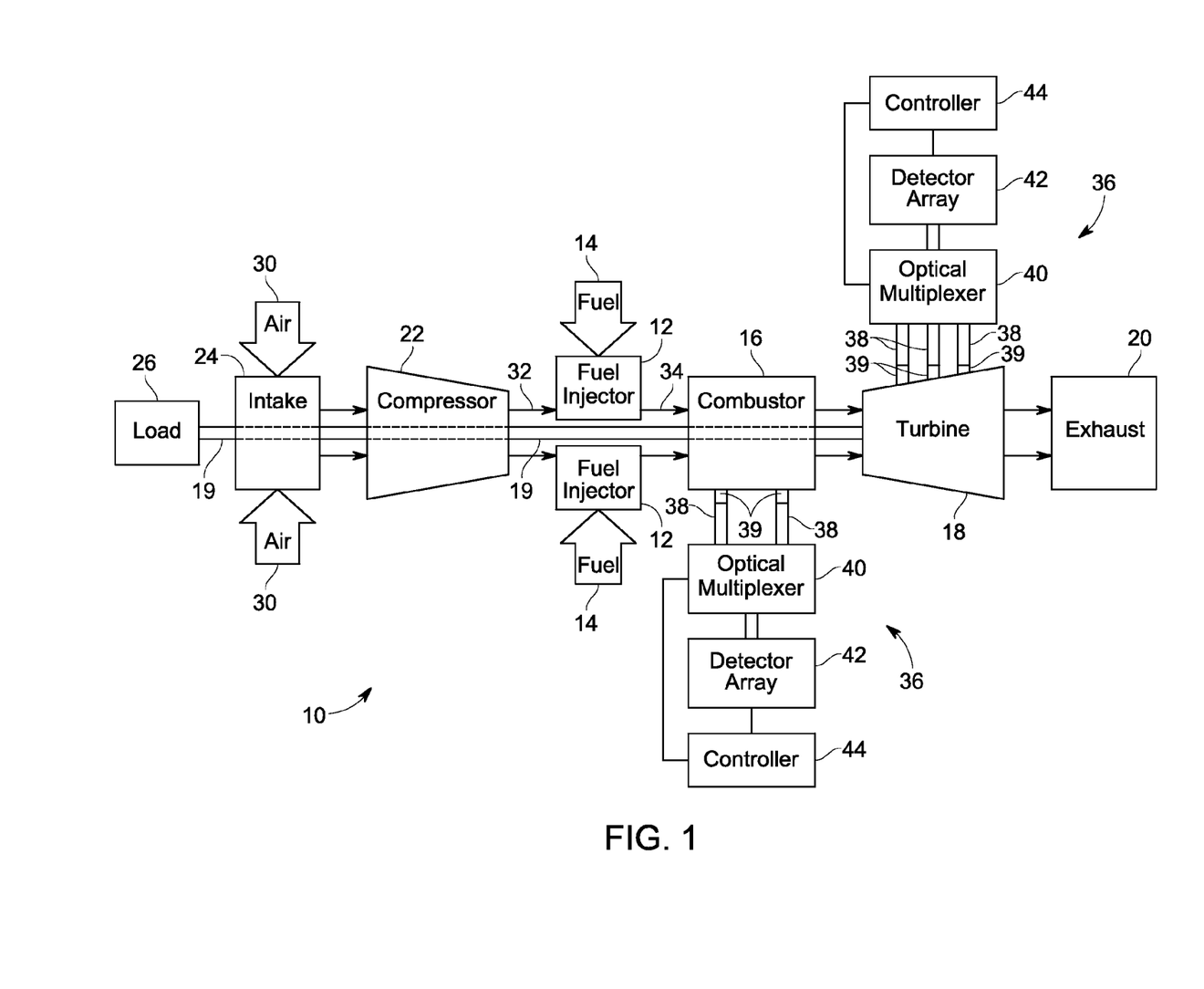
FIG. 1 is a block diagram of an embodiment of a gas turbine system, including an optical monitoring system configured to monitor multiple viewports with a single detector array.

Turning now to the drawings, FIG. 1 is a block diagram of an embodiment of a turbine system 10, including an optical monitoring system configured to monitor multiple viewports with a single detector array. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades that rotate relative to the stators. The exhaust gas passes through the turbine rotor blades, thereby driving the turbine rotor to rotate. Coupling between the turbine rotor and a shaft 19 induces rotation of the shaft 19, which is also coupled to several components throughout the gas turbine system 10, as illustrated. Eventually, the exhaust of the combustion process exits the gas turbine system 10 via an exhaust outlet 20.

A compressor 22 includes blades rigidly mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes an optical monitoring system 36 optically coupled to the turbine 18. In the illustrated embodiment, the optical monitoring system 36 includes optical connections 38 (e.g., fiber optic cables, optical waveguides, etc.) extending between respective viewports 39 into the turbine 18 and an optical multiplexer 40. As discussed in detail below, the optical multiplexer 40 is configured to receive respective images from each viewport 39 and to selectively direct at least a portion of each image toward a detector array 42, which is directed toward a fixed location on the optical multiplexer 40. The detector array 42 is configured to receive the images from the optical multiplexer 40 and to output respective signals indicative of an intensity map (e.g., a one-dimensional intensity map, a two-dimensional intensity map, etc.) of radiant energy within a desired wavelength range for each image. In the illustrated embodiment, the detector array 42 is communicatively coupled to a controller 44, which is configured to receive the signals and to compute a two-dimensional temperature map of each monitored turbine component based on the signals. Because the optical monitoring system 36 generates a two-dimensional temperature map, a temperature gradient across each monitored turbine component may be measured, thereby providing additional information related to component stress, as compared to configurations that only measure a line-of-sight point temperature or an average temperature of each component.

In the illustrated embodiment, the controller 44 is also communicatively coupled to the optical multiplexer 40. As discussed in detail below, the optical multiplexer 40 includes a movable reflective device (e.g., a mirror, a prism, etc.) configured to selectively direct at least a portion of each image from each respective viewport toward the detector array 42. The controller 44 is configured to instruct the reflective device to move between multiple positions, thereby directing corresponding images toward the detector array 42. For example, the controller 44 may instruct the reflective device to rotate to a first position for a first duration, thereby directing a first image toward the detector array. The controller 44 may then instruct the reflective device to rotate to a second position for a second duration, thereby directing a second image toward the detector array. Alternatively, the controller may be configured to instruct the reflective device to continuously rotate through the first and second positions. In further embodiments, the controller may instruct the reflective device to translate to a first position for a first duration, thereby directing a first image toward the detector array. The controller 44 may then instruct the reflective device to translate to a second position for a second duration, thereby directing a second image toward the detector array. By controlling operation of the optical multiplexer 40, the controller 44 may select which image is conveyed from the turbine to the detector array 42.

In certain embodiments, the controller 44 is an electronic controller having electrical circuitry configured to control operation of the optical multiplexer 40 and/or to process data from the detector array 42. For example, the controller 44 may include processors, storage devices, and memory devices. The processor(s) may be used to execute software, such as optical multiplexer control software, image processing software, and so forth. Moreover, the processor(s) may include one or more microprocessors, such as one or more "general-purpose" microprocessors, one or more special-purpose microprocessors, and/or application specific integrated circuits (ASICS), or some combination thereof. For example, the processor(s) may include one or more reduced instruction set (RISC) processors.

The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., image data, multiplexer control data, etc.), instructions (e.g., software or firmware for controlling the multiplexer, etc.), and any other suitable data. The memory device(s) may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for an optical multiplexer control software and/or an image processing software.

In the illustrated embodiment, the gas turbine system 10 includes a second optical monitoring system 36 optically coupled to the combustor 16. Similar to the turbine optical monitoring system described above, the combustor optical monitoring system includes multiple optical connections 38 extending between respective viewports 39 into the combustor 16 and an optical multiplexer 40. The optical multiplexer 40 is configured to receive respective images from the viewports 39 and to selectively direct at least a portion of each image toward a detector array 42, which is directed toward a fixed location on the optical multiplexer 40. While the illustrated embodiment employs separate optical monitoring systems 36 to monitor the combustor 16 and the turbine 18, it should be appreciated that, in alternative embodiments, a single optical monitoring system having a single optical multiplexer may be employed to monitor the combustor 16 and the turbine 18. In such embodiments, one or more optical connections may extend from the turbine 18 and the combustor 16 to the multiplexer 40. In further embodiments, one or more optical monitoring systems may be employed to monitor components within the compressor 22, the intake 24, the fuel injectors 12, and/or the exhaust 20.

Figure 2:
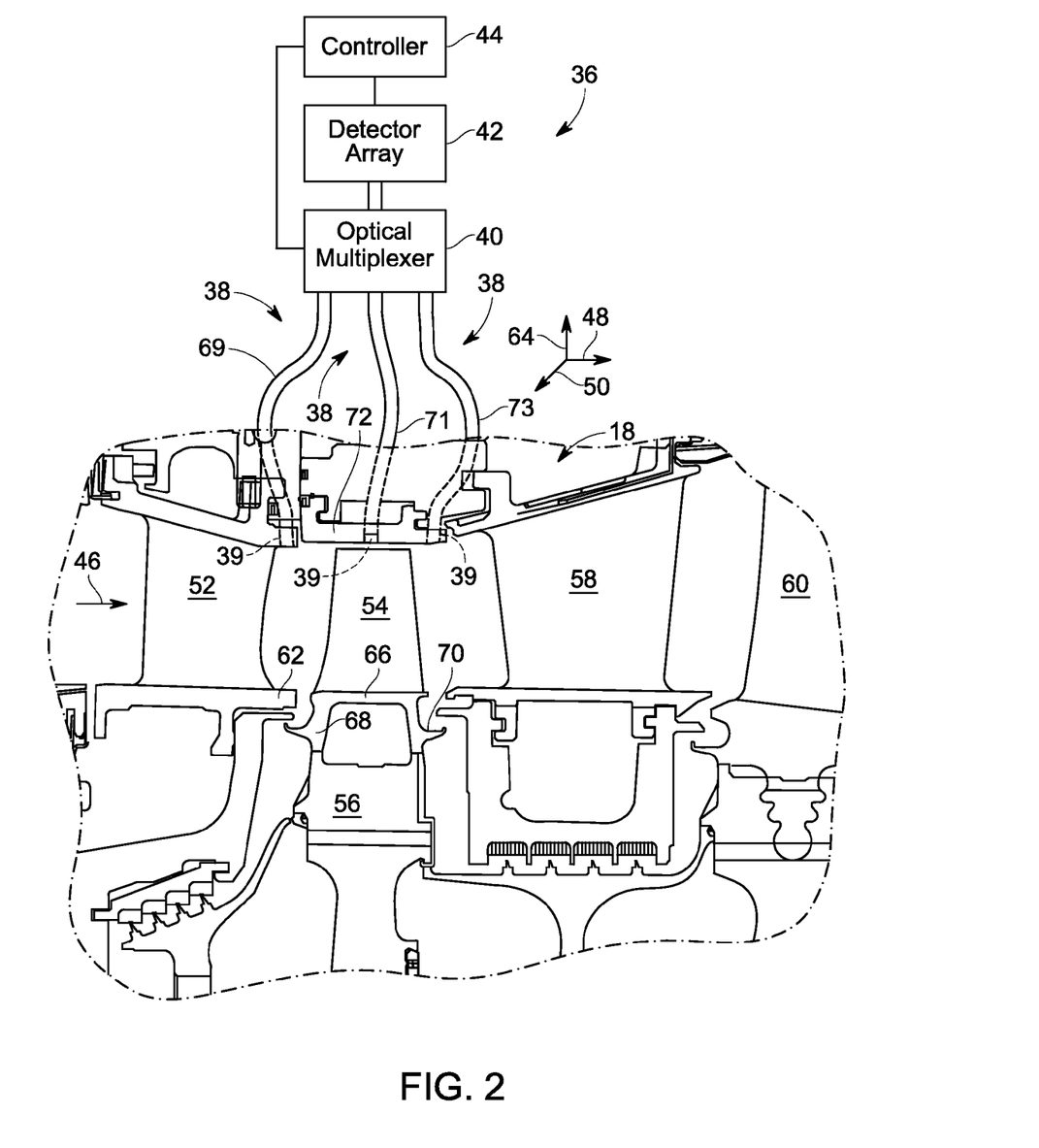
FIG. 2 is a cross-sectional view of an embodiment of a turbine section, including various turbine components that may be monitored by an optical monitoring system.

FIG. 2 is a cross-sectional view of a turbine section, including various turbine components that may be monitored by the optical monitoring system 36. As illustrated, exhaust gas 46 from the combustor 16 flows into the turbine 18 in an axial direction 48 and/or a circumferential direction 50. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 52 and blades 54 substantially equally spaced in the circumferential direction 50 about the turbine 18. The first stage vanes 52 are rigidly mounted to the turbine 18 and configured to direct combustion gas toward the blades 54. The first stage blades 54 are mounted to a rotor 56 that is driven to rotate by the exhaust gas 46 flowing through the blades 54. The rotor 56, in turn, is coupled to the shaft 19, which drives the compressor 22 and the load 26. The exhaust gas 46 then flows through second stage vanes 58 and second stage blades 60. The second stage blades 60 are also coupled to the rotor 56. As the exhaust gas 46 flows through each stage, energy from the gas is converted into rotational energy of the rotor 56. After passing through each turbine stage, the exhaust gas 46 exits the turbine 18 in the axial direction 48.

In the illustrated embodiment, each first stage vane 52 extends outwardly from an endwall 62 in a radial direction 64. The endwall 62 is configured to block hot exhaust gas 46 from entering the rotor 56. A similar endwall may be present adjacent to the second stage vanes 58, and subsequent downstream vanes, if present. Similarly, each first stage blade 54 extends outwardly from a platform 66 in the radial direction 64. As will be appreciated, the platform 66 is part of a shank 68 which couples the blade 54 to the rotor 56. The shank 68 also includes a seal, or angel wing, 70 configured to block hot exhaust gas 46 from entering the rotor 56. Similar platforms and angel wings may be present adjacent to the second stage blades 60, and subsequent downstream blades, if present. Furthermore, a shroud 72 is positioned radially outward from the first stage blades 54. The shroud 72 is configured to reduce the quantity of exhaust gas 46 that bypasses the blades 54. Gas bypass is undesirable because energy from the bypassing gas is not captured by the blades 54 and translated into rotational energy. While the optical monitoring system 36 is described below with reference to monitoring components within the turbine 18 of a gas turbine engine 10, it should be appreciated that the optical monitoring system 36 may be employed to monitor components within other rotating and/or reciprocating machinery, such as a turbine in which steam or another working fluid passes through turbine blades to provide power or thrust.

As will be appreciated, various components within the turbine 18 (e.g., vanes 52 and 58, blades 54 and 60, endwalls 62, platforms 66, angel wings 70, shrouds 72, etc.) are exposed to the hot exhaust gas 46 from the combustor 16. Consequently, it may be desirable to measure a temperature of certain components during operation of the turbine 18 to ensure that the temperature remains within a desired range and/or to monitor thermal stress within the components. For example, the optical monitoring system 36 may be configured to determine a two-dimensional temperature map of the first stage turbine blades 54. As will be appreciated, the two-dimensional temperature map may be utilized to determine a temperature gradient across each blade 54, thereby facilitating computation of thermal stress within the blade 54.

Because the temperature may vary across the surface of the blade 54, the illustrated embodiment includes three viewports 39 directed toward different regions of the blade 54. Three optical connections 38 optically couple the viewports 39 to the optical multiplexer 40. As illustrated, a first optical connection 69 is configured to convey an image of an upstream portion of the blade 54 to the optical multiplexer 40, a second optical connection 71 is configured to convey an image of a circumferential side of the blade 54 to the optical multiplexer 40, and a third optical connection 73 is configured to convey an image of a downstream portion of the blade 54 to the optical multiplexer 40. The viewports 39 may be angled in the axial direction 48, circumferential direction 50, and/or radial direction 64 to direct the viewports 39 toward desired regions of the blade 54. In alternative embodiments, more or fewer viewports 39 and optical connections 38 may be employed to obtain images of the first stage blade 54. For example, certain embodiments may employ 1, 2, 3, 4, 5, 6, 7, 8, or more viewports 39 and a corresponding number of optical connections 38 to convey images of the blade 54 to the optical multiplexer 40. As will be appreciated, the more viewports 39 and optical connections 38 employed, the more regions of the blade 54 that may be monitored. The optical connections 38 may include a fiber optic cable or an optical imaging system (e.g., a rigid imaging optical waveguide system), for example. It should also be appreciated that certain embodiments may omit the optical connections 38, and the optical multiplexer 40 may be directly optically coupled to the viewports 39.

While the viewports 39 are directed toward the first stage blades 54 in the illustrated embodiment, it should be appreciated that the viewports 39 may be directed toward other turbine components in alternative embodiments. For example, one or more viewports 39 may be directed toward the first stage vanes 52, the second stage vanes 58, the second stage blades 60, the endwalls 62, the platforms 66, the angel wings 70, the shrouds 72, or other components within the turbine 18. Further embodiments may include viewports 39 directed toward multiple components within the turbine 18. Similar to the first stage blades 54, the optical monitoring system 36 may determine a two-dimensional temperature map for each component within a field of view of a viewport 39. In this manner, thermal stress within various turbine components may be measured, thereby providing an operator with data that may be used to adjust operational parameters of the turbine system 10 and/or to determine maintenance intervals.

As previously discussed, the optical connections 38 (e.g., fiber optic cable, optical waveguide, etc.) convey images from the turbine 18 to the optical multiplexer 40. The optical multiplexer 40, in turn, is configured to selectively convey each image to the detector array 42. The optical multiplexer 40 includes a movable reflective device configured to selectively direct at least a portion of each image toward the detector array 42, which is directed toward a fixed location on the optical multiplexer. As discussed in detail below, the movable reflective device (e.g., a mirror, a prism, etc.) is configured to rotate or translate to selectively direct each image toward the detector array 42. Accordingly, the movable reflective device may be rotatable, thereby facilitating movement in rotation, or translatable, thereby facilitating movement in translation.

The detector array 42 is configured to receive each image and to output signals indicative of an intensity map of radiant energy within a desired wavelength range for each image. The detector array 42 may be configured to capture multiple images over a period of time. As will be appreciated, certain turbine components, such as the first stage blades 54 described above, may rotate at high speed along the circumferential direction 50 of the turbine 18. Consequently, to capture an image of such components, the detector array 42 may be configured to operate at a frequency sufficient to provide the controller 44 with a substantially still image of each component. For example, in certain embodiments, the detector array 42 may be configured to output the signals indicative of the intensity map of each image at a frequency greater than approximately 25,000, 50,000, 100,000, 200,000, 400,000, 600,000, 800,000, or 1,000,000 Hz, or more. In further embodiments, the detector array 42 may be configured to output the signals indicative of the intensity map of each image with an integration time shorter than approximately 25, 20, 15, 10, 5, 3, 2, 1, or 0.5 microseconds, or less. In this manner, a two-dimensional temperature map may be generated for each rotating turbine component.

Figure 3:
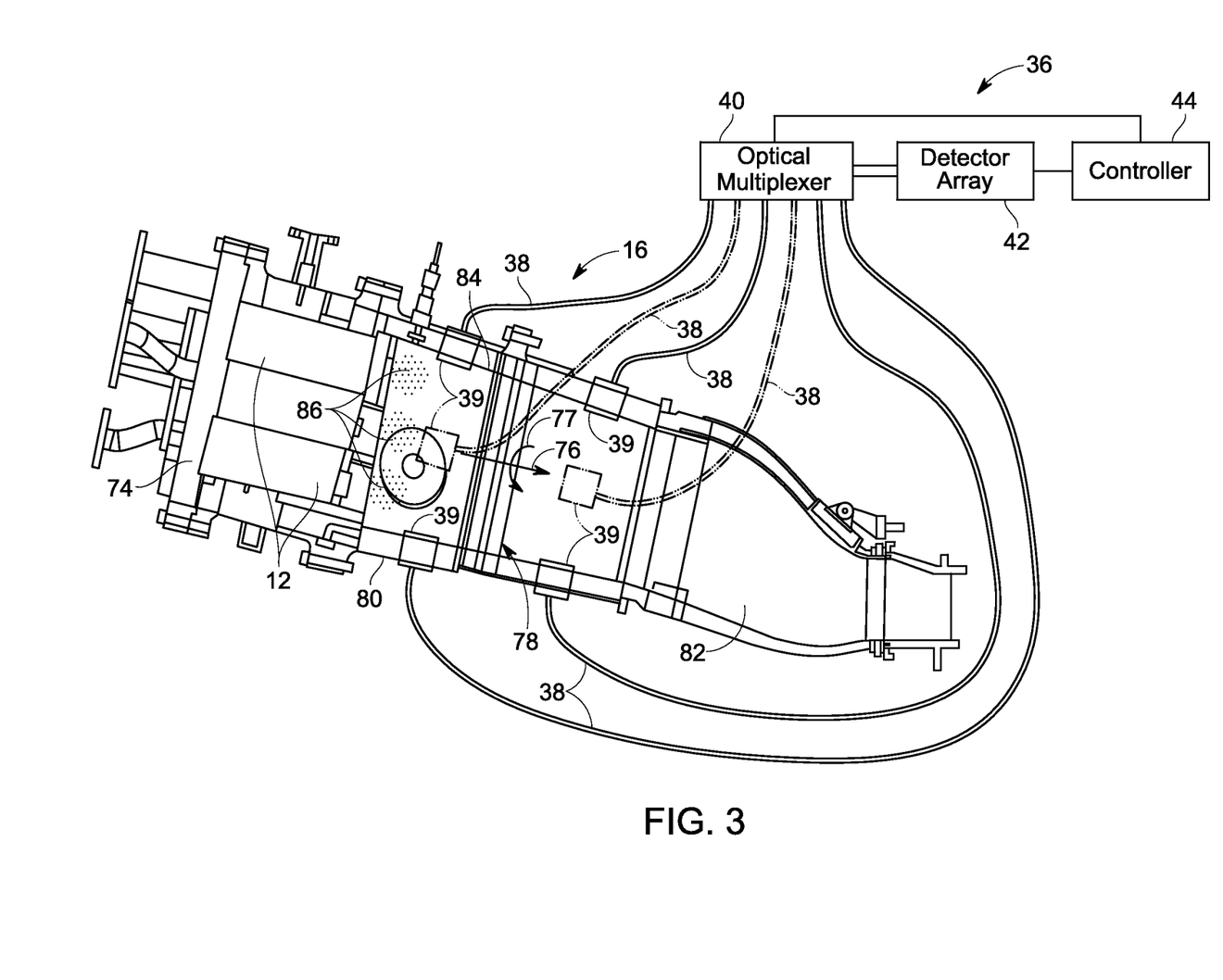
FIG. 3 is a cross-sectional view of an embodiment of a combustor, including various combustor components that may be monitored by an optical monitoring system.

FIG. 3 is a cross-sectional view of an embodiment of a combustor 16, including various combustor components that may be monitored by the optical monitoring system 36. As illustrated, the combustor 16 includes fuel nozzles 12 that are attached to an end cover 74 at a base of the combustor 16. In certain embodiments, the combustor 16 may include five or six fuel nozzles 12. In other embodiments, the combustor 16 may include a single large fuel nozzle 12. The surfaces and geometry of the fuel nozzles 12 are particularly configured to enhance mixing of the air and fuel as the fuel-air mixture flows downstream through the combustor 16. The enhanced mixing may increase combustor efficiency, thereby producing more power in the turbine engine. The fuel-air mixture is expelled from the fuel nozzles 12 in a downstream direction 76 to a combustion zone 78 inside a combustor casing 80. The combustion zone 78 is positioned downstream from the fuel nozzles 12 to reduce heat transfer from the hot combustion gas to the fuel nozzles 12. In the illustrated embodiment, the combustion zone 78 is located inside the combustor casing 80, downstream from the fuel nozzles 12 and upstream from a transition piece 82 of the combustor 16. The transition piece 82 directs the pressurized exhaust gas toward the turbine 18, and includes a converging section configured to increase a velocity of the exhaust gas, thereby producing a greater force to drive the turbine 18 in rotation. In the illustrated embodiment, the combustor 16 includes a liner 84 located inside the casing 80 to provide a hollow annular path for a cooling air flow, which cools the casing 80 around the combustion zone 78. The liner 84 may establish a suitable shape to improve flow from the fuel nozzles 12 to the turbine 18.

In the illustrated embodiment, the optical monitoring system 36 includes six optical connections 38 to six respective viewports 39 into the combustor 16. As illustrated, the viewports 39 are distributed along the length of the combustor 16 in the direction 76 and about the circumference of the combustor 16 in the direction 77. Each viewport 39 may be directed toward a region of interest within combustor 16. For example, in the illustrated embodiment, the viewports 39 located proximate to the fuel nozzles 12 are directed toward surfaces (e.g., the liner 84, etc.) within the combustion zone 78 proximate to flames 86, and the viewports 39 located farther downstream are directed toward the combustor liner 84 and/or the transition piece 82. In this manner, various regions of the combustor 16 may be monitored by the optical monitoring system 36. In addition, by positioning viewports 39 circumferentially around the combustor 16 in the direction 77, the optical monitoring system 36 may monitor different portions of the combustor liner 84 and/or the transition piece 82.

Similar to the optical monitoring system 36 described above with reference to the turbine 18, the combustor optical monitoring system 36 includes an optical multiplexer 40 configured to receive multiple images from respective viewports 39 into the combustor 16. The optical multiplexer 40 includes a movable reflective device configured to selectively direct at least a portion of each image toward the detector array 42, which is directed toward a fixed location on the optical multiplexer 40. Because the optical multiplexer 40 is configured to selectively direct multiple images from multiple viewports 39 toward a single detector array, the cost of the optical monitoring system may be substantially reduced, as compared to optical monitoring systems having multiple detector arrays (e.g., one detector array for each respective viewport).

While the illustrated embodiment includes six viewports into the combustor 16, it should be appreciated that alternative embodiments may include more or fewer viewports. For example, in certain embodiments, the combustor 16 may include 2, 4, 6, 8, 10, 12, or more viewports 39. Furthermore, while the optical monitoring system 36 is configured to monitor a single combustor in the illustrated embodiment, it should be appreciated that, in alternative embodiments, the optical monitoring system 36 may be configured to monitor multiple combustors. For example, optical connections 38 may extend from the optical multiplexer 40 to each combustor 16 within the gas turbine engine. By way of example, if the gas turbine engine includes twelve combustors 16 and each combustor 16 includes two viewports 39, a total of 24 optical connections 38 may extend from each viewport 39 to a single optical multiplexer 40. In such a configuration, the optical multiplexer 40 is configured to selectively direct at least a portion of each image from each respective viewport to the detector array 42. In further embodiments, multiple optical monitoring systems, each having an optical multiplexer and a detector array, may be employed to monitor one or more combustors within the turbine system. In addition, while the optical monitoring system 36 is configured to monitor one or more combustors of a gas turbine engine in the illustrated embodiment, it should be appreciated that the optical monitoring system 36 may be employed to monitor a combustor of another machine or device, such as a combustor within a boiler or a gasification system.

Figure 4:
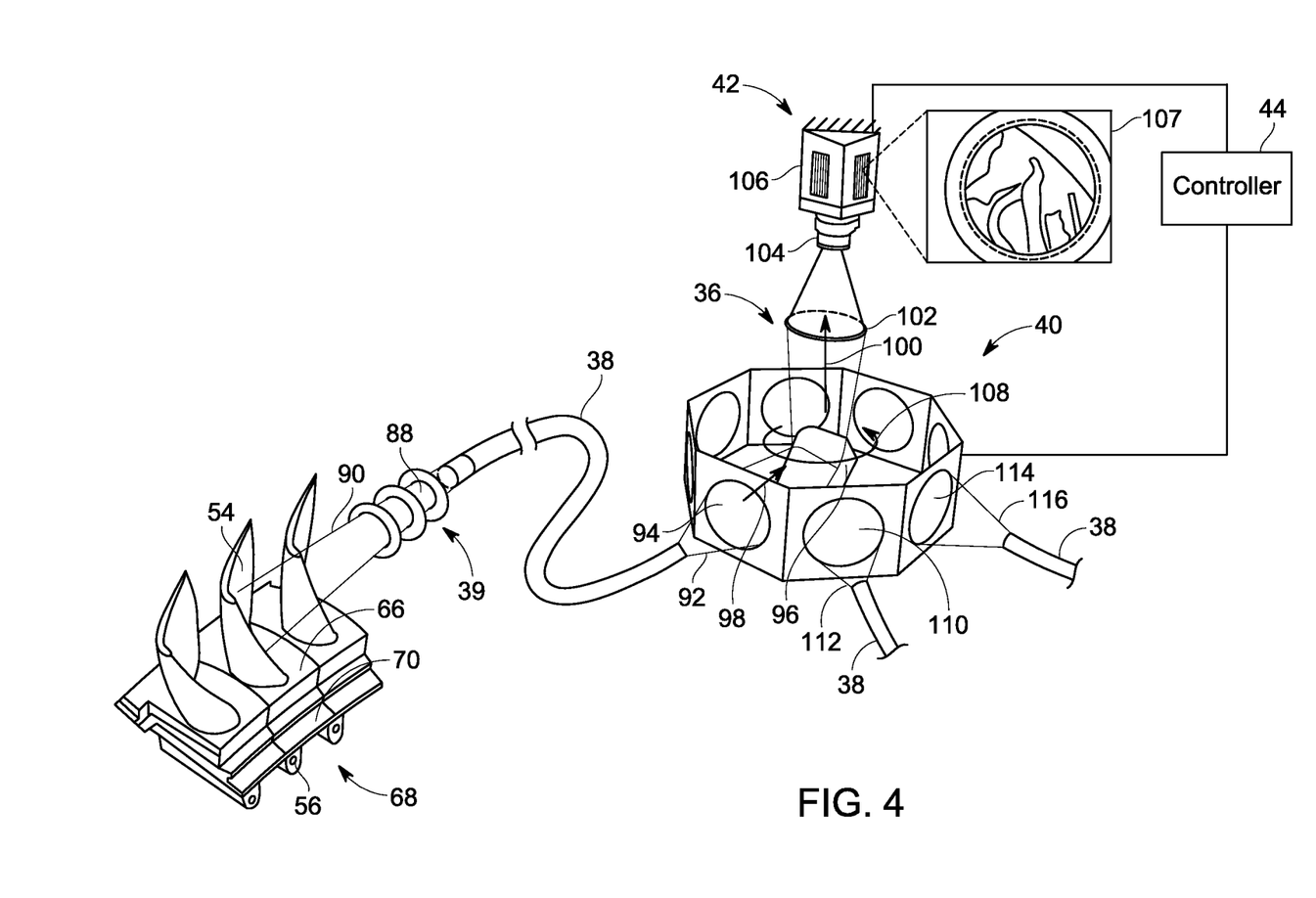
FIG. 4 is a schematic view of an embodiment of an optical monitoring system having an optical multiplexer.

FIG. 4 is a schematic view of an embodiment of an optical monitoring system 36 having an optical multiplexer 42. In the illustrated embodiment, a viewport 39 is directed toward a blade 54 of the turbine 18. The viewport 39 includes a lens 88 having a field of view 90 configured to capture an image of a desired region of the blade 54. The optical connection 38, such as the illustrated fiber optic cable, is configured to convey the image to the optical multiplexer 40. While the illustrated viewport 39 is directed toward a blade 54 of the turbine 18, it should be appreciated that the viewport 39 may be directed toward the platform 66 or the angle wing 70 in alternative embodiments. In addition, it should be appreciated that the viewport 39 may be directed toward a component of the combustor, such as the liner or the transition piece.

As illustrated, the optical connection 38 is configured to project an image 92 of the blade 54 onto a lens 94 of the optical multiplexer 40. The lens 94 is configured to focus at least a portion of the image onto the detector array 42 via a reflective device, such as the illustrated prism 96. In the illustrated embodiment, the prism 96 is configured to receive an image from a radially inward direction 98 and to reflect the image in an axial direction 100 (e.g., about 90 degrees relative to the radially inward direction) toward the detector array 42. As will be appreciated, the geometry of the prism 96 and/or coatings applied to the prism 96 may be particularly selected to efficiently reflect images of a desired wavelength range. For example, if the detector array 42 is configured to monitor short-wave infrared images, the prism 96 may be particularly configured to reflect short-wave infrared images in the axial direction 100 toward the detector array 42. While the illustrated optical multiplexer 40 includes a prism to reflect the image toward the detector array 42, it should be appreciated that, in alternative embodiments, the optical multiplexer may include a mirror or other reflective device to reflect the image in the axial direction 100.

In the illustrated embodiment, a second lens 102 is configured to focus the image from the prism onto a third lens 104 of an infrared camera 106. As illustrated, the infrared camera 106 is directed toward a fixed location on the optical multiplexer 40 (e.g., toward the second lens 102 and the prism 96). The infrared camera 106 includes the detector array 42, which may be configured to detect short-wave infrared images and/or mid-wave infrared images. As will be appreciated, short-wave infrared images may be suitable for determining a temperature of cooler components, such as components within the turbine 18, and mid-wave infrared images may be suitable for determining a temperature of warmer components, such as components within the combustor 16. To focus each image onto the detector array 42, the infrared camera 106 may be coupled to a translation assembly that enables the camera 106 to translate in the axial direction 100. The detector array 42 is configured to output signals indicative of an intensity map of thermal radiation emitted by the monitored component, such as the illustrated two-dimensional intensity map 107 of the turbine blade 54. The controller 44, in turn, is configured to receive the signals and to determine a two-dimensional temperature map of the monitored component. Accordingly, a temperature gradient across each monitored turbine component may be measured, thereby providing additional information related to component stress.

In the illustrated embodiment, the optical multiplexer 40 includes eight multiplexer lenses substantially even distributed in a circumferential direction 108. Accordingly, the prism 96 is configured to rotate in the circumferential direction 108 from a first position substantially aligned with the first multiplexer lens 94 to a second position substantially aligned with a second multiplexer lens 110. While in the first position, the prism 96 directs at least a portion of the first image 92 toward the detector array 42, and while in the second position, the prism 96 directs at least a portion of a second image 112 (e.g., from another viewport into the turbine 18) toward the detector array 42. Accordingly, a single detector array 42 may monitor images from two remote locations within the gas turbine engine. As the prism 96 continues to rotate in the circumferential direction 108, the prism transitions to a third position aligned with a third multiplexer lens 114, thereby directing at least a portion of a third image 116 (e.g., from another viewport into the turbine 18) toward the detector array 42. While the illustrated optical multiplexer 40 is configured to selectively direct eight images from eight respective viewports toward the detector array 42, it should be appreciated that alternative multiplexers may be configured to selectively direct more or fewer images to the detector array. For example, in certain embodiments, the optical multiplexer may include 2, 4, 6, 8, 10, 12, or more lenses, thereby enabling the optical multiplexer to selectively direct a corresponding number of images to the detector array. Furthermore, in certain embodiments, the multiplexer lenses may be omitted, and the optical connection 38 may project an image directly onto the rotating prism 96.

In the illustrated embodiment, the controller 44 is communicatively coupled to the optical multiplexer 40 and configured to control operation of the multiplexer. In certain embodiments, the controller 44 is configured to instruct the prism 96 (e.g., via a drive mechanism) to continuously rotate through each position, thereby sequentially directing at least a portion of each image toward the detector array 42. For example, while the prism 96 is directed toward the first multiplexer lens 94, the prism directs at least a portion of the first image 92 toward the detector array 42. As the prism 96 rotates to an intermediate position between the first and second lenses 94 and 110, the prism 96 directs a portion of the first image 92 and a portion of the second image 110 toward the detector array. And, while the prism 96 is directed toward the second multiplexer lens 110, the prism directs at least a portion of the second image toward the detector array 42. In this manner, the images from each viewport are sequentially directed toward the detector array 42.

In certain embodiments, the controller 44 is configured to coordinate operation of the detector array 42 with the rotation of the prism 96. For example, the controller 44 may instruct the detector array to capture an image while the prism is aligned with each respective multiplexer lens. In alternative embodiments, the detector array 42 may substantially continuously capture images from the multiplexer as the prism rotates, and the controller 44 may process the captured images to establish a respective image for each viewport. For example, in certain embodiments, the detector array 42 may be configured to capture a series of one-dimensional intensity maps as the prism 96 rotates across each two-dimensional viewport image. In such embodiments, the controller 44 may be configured to construct a two-dimensional intensity map of each component by combining the series of one-dimensional maps.

In further embodiments, the controller 44 is configured to instruct the prism (e.g., via a drive mechanism) to rotate to each position for a desired duration. For example, in certain embodiments, the controller 44 instructs the prism to rotate to the first position for a first duration to capture multiple images from the first viewport. The controller 44 then instructs the prism 96 to rotate to the second position for a second duration to capture multiple images from the second viewport. In this manner, multiple images may be captured from each viewport. The first and second durations may be particularly selected based on the component being monitored. For example, if the first viewport is directed toward a rotating turbine blade, the first duration may be particularly selected to capture the blade, or multiple blades, through a desired number of rotations of the turbine rotor.

The prism 96 may be driven to rotate by any suitable drive mechanism. For example, in certain embodiments, the prism may be coupled to an electric motor, a pneumatic motor, or a hydraulic motor to facilitate rotation of the prism 96. In further embodiments, the prism may be driven to rotate via a magnetic field or an electric field (e.g., via a galvanometer). The controller 44 is communicatively coupled to the drive mechanism to control rotation of the prism.

Figure 5:
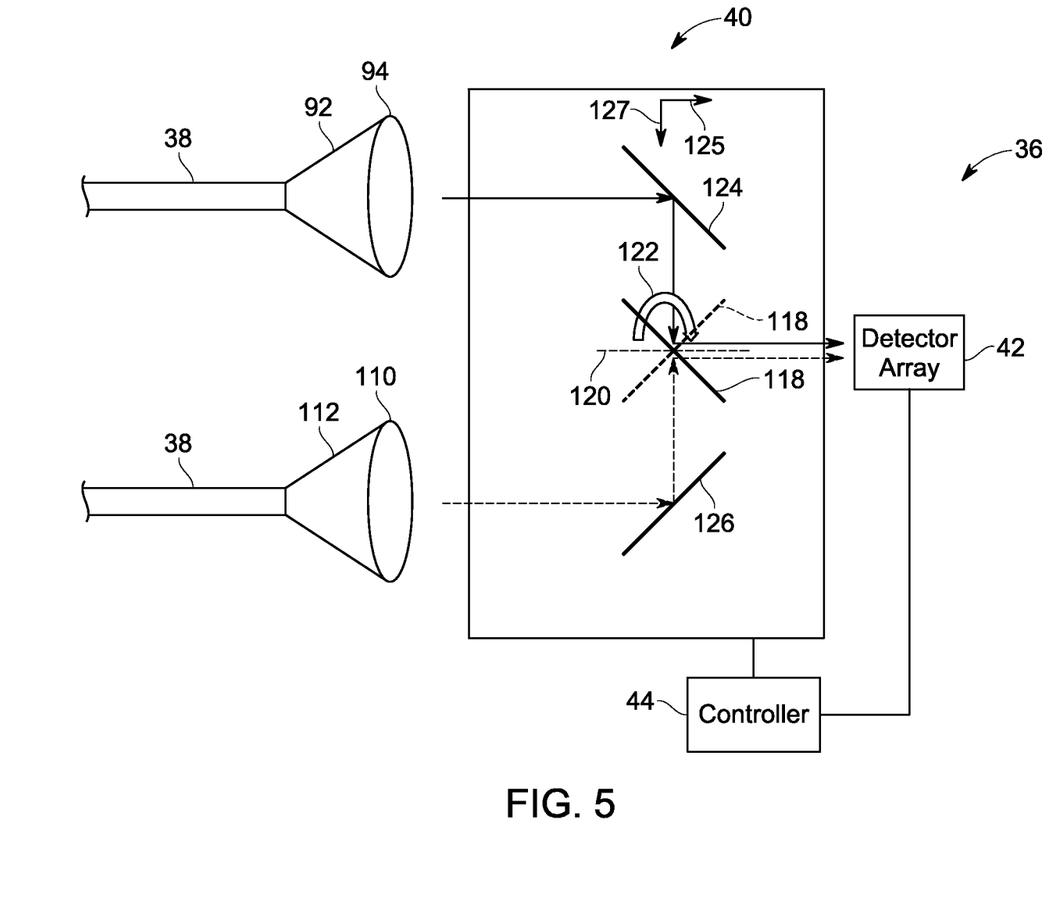
FIG. 5 is a schematic view of another embodiment of an optical monitoring system having an optical multiplexer.

FIG. 5 is a schematic view of another embodiment of an optical monitoring system having an optical multiplexer. Similar to the embodiment described above with reference to FIG. 4, the optical multiplexer 40 is configured to receive multiple images from respective viewports into the gas turbine engine. In the illustrated embodiment, the optical multiplexer 40 includes a rotating mirror 118 configured to selectively direct at least a portion of each image toward the detector array 42. As illustrated, the mirror 118 is configured to rotate about a central axis 120 of the optical multiplexer 40 in a circumferential direction 122. In addition, the optical connections 38 and corresponding multiplexer lenses are substantially evenly distributed about the central axis 120 in the circumferential direction 122. In this configuration, rotation of the mirror 118 selectively directs at least a portion of each image toward the detector array 42. For example, with the mirror 118 oriented in the illustrated first position, a first stationary mirror 124 receives a first image from an axial direction 125 and reflects the image about 90 degrees to a radially inward direction 127, thereby directing the image toward the rotating mirror 118. The rotating mirror 118, in turn, reflects the first image about 90 degrees from the radially inward direction 127 to the axial direction 125, thereby directing the image toward the detector array 42. The mirror 118 then rotates to a second position, as illustrated by the dashed lines. With the mirror 118 oriented in the second position, a second stationary mirror 126 receives a second image from the axial direction 125 and reflects the image about 90 degrees to the radially inward direction 127, thereby directing the image toward the rotating mirror 118. The rotating mirror 118, in turn, reflects the second image about 90 degrees from the radially inward direction 127 to the axial direction 125, thereby directing the image toward the detector array 42. While the illustrated optical multiplexer 40 is configured to receive two images from two respective viewports, it should be appreciated that, in certain embodiments, the optical multiplexer may be configured to receive 2, 4, 6, 8, 10, 12, 14, 16, or more images from respective optical connections distributed about the central axis 120 in the circumferential direction 122.

Similar to the embodiment described above with reference to FIG. 4, any suitable drive mechanism (e.g., electric motor, pneumatic motor, etc.) may be utilized to drive the mirror 118 in rotation. In addition, it should be appreciated that the mirror may include a coating particularly configured to reflect light within a desired wavelength range (e.g., short-wave infrared, mid-wave infrared, etc.). Furthermore, while the illustrated embodiment includes a rotating mirror 118, it should be appreciated that alternative embodiments may employ a rotating prism or other reflective device. In the illustrated embodiment, the controller 44 is communicatively coupled to the optical multiplexer 40 and configured to control operation of the multiplexer. For example, the controller 44 may be configured to instruct the mirror 118 (e.g., via a drive mechanism) to rotate to the first position for a first duration, and then to rotate to the second position for a second duration, thereby enabling the detector array to sequentially capture images from each viewport. In addition, the controller 44 may be configured to instruct the mirror 118 (e.g., via a drive mechanism) to continuously rotate through the first and second positions, thereby sequentially directing at least a portion of each image toward the detector array 42.

Figure 6:
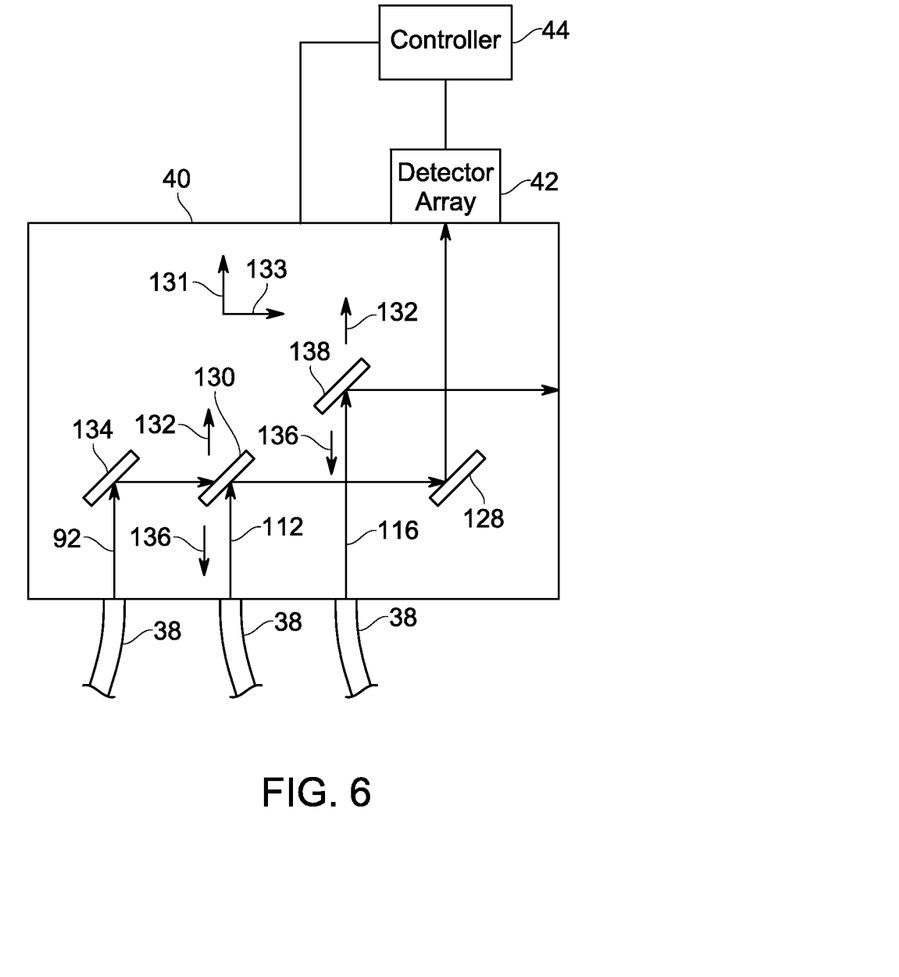
FIG. 6 is a schematic view of a further embodiment of an optical monitoring system having an optical multiplexer.

FIG. 6 is a schematic view of a further embodiment of an optical monitoring system having an optical multiplexer. Similar to the embodiment described above with reference to FIG. 4, the optical multiplexer 40 is configured to receive multiple images from respective viewports into the gas turbine engine. In the illustrated embodiment, the optical multiplexer 40 includes a movable mirror configured to translate between multiple positions to selectively direct at least a portion of a first image or a second image toward a detector array. As illustrated, the optical multiplexer 40 includes a fixed mirror 128 configured to reflect an image from a respective viewport toward the detector array 42. The optical multiplexer also includes a first movable mirror 130 configured to reflect a second image 112 toward the fixed mirror 128 while the first movable mirror 130 is in the illustrated first position. Accordingly, with the first movable mirror 130 in the first position, the second image 112 is received along a longitudinal direction 131, reflected off the first movable mirror 130 about 90 degrees to a lateral direction 133, and then reflected off the fixed mirror 128 about 90 degrees to the longitudinal direction 131, thereby directing the second image toward the detector array 42. The first movable mirror 130 is configured to translate in a direction 132 to a second position. With the first movable mirror 130 in the second position, the second image 112 is directed away from the fixed mirror 128 (e.g., above the fixed mirror along the longitudinal direction 131). In addition, a second fixed mirror 134 reflects a first image 92 toward the first fixed mirror 128. Accordingly, with the first movable mirror 130 in the second position, the first image 92 is received along the longitudinal direction 131, reflected off the second fixed mirror 134 about 90 degrees to the lateral direction 133, and then reflected off the fixed mirror 128 about 90 degrees to the longitudinal direction 131, thereby directing the first image 92 toward the detector array 42. The first movable mirror 130 may then translate back to the first position in the direction 136, thereby blocking the first image 92 and directing the second image 112 toward the detector array 42. By selectively translating the first movable mirror 130 between the first and second positions, the optical multiplexer 40 may cyclically direct the first image and the second image toward the detector array.

In the illustrated embodiment, the optical multiplexer 40 includes a second movable mirror 138 configured to reflect a third image 116 toward the fixed mirror 128 while the second movable mirror 138 is in a first position (e.g., aligned with the fixed mirror 128). Accordingly, with the second movable mirror 138 in the first position, the third image 116 is received along the longitudinal direction 131, reflected about 90 degrees off the second movable mirror 138 to the lateral direction 133, and then reflected off the fixed mirror 128 about 90 degrees to the longitudinal direction 131, thereby directing the third image 116 to the detector array 42. The second movable mirror 138 is configured to translate in the direction 132 to the illustrated second position. With the second movable mirror 138 in the second position, the third image 116 is directed away from the fixed mirror 128 (e.g., above the fixed mirror 128 in the longitudinal direction 131). In addition, the first image 92 or the second image 112 (e.g., depending on the position of the first movable mirror 130) is directed toward the detector array 42 (e.g., by being reflected off the second fixed mirror 134 or the first movable mirror 130, and the first fixed mirror 128). The third movable mirror 138 may then translate back to the first position in the direction 136, thereby blocking the first image 92 or the second image 112, and directing the third image 116 toward the detector array 42. By selectively translating the first and second movable mirrors between the respective first and second positions, the optical multiplexer 40 may sequentially direct the first, second, and third images toward the detector array. While the illustrated optical multiplexer 40 includes two movable mirrors configured to selectively direct three images toward the detector array, it should be appreciated that, in alternative embodiments, more or fewer mirrors may be employed to direct more or fewer images toward the detector array. For example, in certain embodiments, the optical multiplexer may include 1, 2, 3, 5, 7, 9, 11, or more movable mirrors.

As will be appreciated, any suitable drive mechanism (e.g., electric motor, pneumatic motor, linear actuator, linear motor, etc.) may be utilized to drive the movable mirrors 130 and 138 in translation. In addition, it should be appreciated that the mirrors may include respective coatings particularly configured to reflect light within a desired wavelength range (e.g., short-wave infrared, mid-wave infrared, etc.). Furthermore, while the illustrated embodiment includes translating mirrors 130 and 138, it should be appreciated that alternative embodiments may employ translating prisms or other reflective devices. In the illustrated embodiment, the controller 44 is communicatively coupled to the optical multiplexer 40 and configured to control operation of the multiplexer. For example, the controller 44 may be configured to instruct the first movable mirror 130 (e.g., via a drive mechanism) to translate to the first position for a first duration, and then to translate to the second position for a second duration, thereby enabling the detector array to sequentially capture the second image and the first image. In addition, the controller 44 may be configured to instruct the second movable mirror 138 (e.g., via a drive mechanism) to translate to the first position for a third duration, and then to translate to the second position for a fourth duration. Accordingly, the detector array may capture the third image while the second movable mirror 138 is in the first position and capture the first or second image (e.g., depending on the position of the first movable mirror 130) while the second movable mirror 138 is in the second position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A monitoring system for optically monitoring a gas turbine system, comprising:
an optical multiplexer configured to receive a plurality of images from a respective plurality of viewports into the gas turbine system, wherein the optical multiplexer comprises a movable reflective device situated outside of the gas turbine system and configured to selectively direct at least a portion of each image toward a detector array, wherein the reflective device comprises a mirror or a prism, and wherein the detector array is directed toward a fixed location on the optical multiplexer.

2. The monitoring system of claim 1, wherein the reflective device is configured to translate between a first position that directs at least a portion of a first image toward the detector array and a second position that directs at least a portion of a second image toward the detector array.

3. The monitoring system of claim 1, comprising an infrared camera having the detector array, wherein the detector array is configured to detect short-wave infrared images, mid-wave infrared images, or a combination thereof.

4. The monitoring system of claim 1, comprising a plurality of optical connections configured to convey each image from the respective viewport to the optical multiplexer.

5. The monitoring system of claim 1, wherein the optical multiplexer comprises a plurality of lenses configured to focus each respective image onto the detector array via the reflective device.

6. The monitoring system of claim 1, wherein the reflective device is configured to rotate between a first position that directs at least a portion of a first image toward the detector array and a second position that directs at least a portion of a second image toward the detector array.

7. The monitoring system of claim 6, wherein the monitoring system is configured to rotate the reflective device to the first position for a first duration and to the second position for a second duration.

8. The monitoring system of claim 6, wherein the monitoring system is configured to continuously rotate the reflective device through the first and second positions.

9. A monitoring system for optically monitoring a gas turbine system, comprising:
a detector array; and
an optical multiplexer configured to receive a first image from a first viewport into the gas turbine system and to receive a second image from a second viewport into the gas turbine system, wherein the optical multiplexer comprises a movable reflective device situated outside of the gas turbine system and configured to selectively move between a first position that directs at least a portion of the first image toward the detector array and a second position that directs at least a portion of the second image toward the detector array, and wherein the reflective device comprises a mirror or a prism;
wherein the detector array is directed toward a fixed location on the optical multiplexer.

10. The monitoring system of claim 9, comprising an infrared camera having the detector array, wherein the detector array is configured to detect short-wave infrared images, mid-wave infrared images, or a combination thereof.

11. The monitoring system of claim 9, wherein the detector array is configured to detect multidimensional images.

12. The monitoring system of claim 9, wherein the monitoring system is configured to monitor the gas turbine system while the gas turbine system is in operation.

13. A monitoring system for optically monitoring a gas turbine system, comprising:
a detector array;
an optical multiplexer configured to receive a first image from a first viewport into the gas turbine system and to receive a second image from a second viewport into the gas turbine system, wherein the optical multiplexer comprises a movable reflective device configured to selectively direct at least a portion of each image toward the detector array; and
a controller configured to instruct the reflective device to move between a first position that directs at least a portion of the first image toward the detector array and a second position that directs at least a portion of the second image toward the detector array;
wherein the detector array is directed toward a fixed location on the optical multiplexer,
wherein the gas turbine system comprises a compressor, a combustor, a turbine, an intake, and an exhaust, and wherein the first and second viewports are positioned to enable viewing of images from at least one of the compressor, the combustor, the turbine, the intake, and the exhaust.

14. The monitoring system of claim 13, wherein the controller is configured to instruct the reflective device to rotate to the first position for a first duration and to the second position for a second duration.

15. The monitoring system of claim 13, wherein the controller is configured to instruct the reflective device to continuously rotate through the first and second positions.

16. The monitoring system of claim 13, wherein the controller is configured to instruct the reflective device to translate to the first position for a first duration and to the second position for a second duration.

* * * * *